(12) United States Patent
Burton et al.

(10) Patent No.: US 9,242,747 B1
(45) Date of Patent: Jan. 26, 2016

(54) SPACE THRUSTER USING ROBUST MICROCAVITY DISCHARGE AND ADVANCED PROPELLANTS

(71) Applicant: CU Aerospace, LLLC, Champaign, IL (US)

(72) Inventors: Rodney L. Burton, Champaign, IL (US); Gabriel F. Benavides, Champaign, IL (US); David L. Carroll, Urbana, IL (US)

(73) Assignee: CU Aerospace, LLC, Champaign, IL (US)

( * ) Notice: Subject to any disclaimer, the term of this patent is extended or adjusted under 35 U.S.C. 154(b) by 616 days.

(21) Appl. No.: 13/680,484

(22) Filed: Nov. 19, 2012

Related U.S. Application Data

(60) Provisional application No. 61/561,317, filed on Nov. 18, 2011.

(51) Int. Cl.
*F03H 1/00* (2006.01)
*B64G 1/40* (2006.01)
*H05H 1/24* (2006.01)

(52) U.S. Cl.
CPC .............. *B64G 1/405* (2013.01); *B64G 1/406* (2013.01); *F03H 1/0012* (2013.01); *F03H 1/0018* (2013.01); *F03H 1/0081* (2013.01); *F03H 1/0087* (2013.01); *F03H 1/0093* (2013.01); *H05H 1/2406* (2013.01); *H05H 2001/2412* (2013.01); *H05H 2001/2431* (2013.01); *H05H 2001/2437* (2013.01); *H05H 2001/2443* (2013.01); *H05H 2001/2462* (2013.01)

(58) Field of Classification Search
CPC ... F03H 1/0093; F03H 1/0012; F03H 1/0018; F03H 1/0081; F03H 1/0087; B64G 1/406; H05H 1/2406; H05H 2001/2443; H05H 2001/2462; H05H 2001/2412; H05H 2001/2431; H05H 2001/2437
See application file for complete search history.

(56) References Cited

U.S. PATENT DOCUMENTS 4,638,149 A * 1/1987 Wessel et al. ................. 219/499
6,263,665 B1 * 7/2001 Ketsdever et al. ........... 60/203.1

OTHER PUBLICATIONS de Chadenedes "Advances in Microcavity Discharge Thruster Technology", Jul. 2010, AIAA/ASME/SAE/ASEE Joint Propulsion Conference & Exhibit, pp. 1-10, http://enu.kz/repository/2010/AIAA-2010-6616.pdf.*

* cited by examiner

*Primary Examiner* — William H Rodriguez
*Assistant Examiner* — William Breazeal
(74) *Attorney, Agent, or Firm* — Adam K. Sacharoff; Much Shelist

(57) ABSTRACT

It is disclosed herein an innovative concept for in-space propulsion for future Air Force, NASA and commercial systems having mass and power scalability over a wide range and using easily-handled advanced propellants. The invention combines the fields of microdischarge physics and nonequilibrium plasmadynamics to reduce dramatically the size of electric thrusters by 1-2 orders of magnitude, which when coupled with micronozzles that are electrically conducting or electrically insulating result in high thrust and high thruster efficiency, and will enable scalable, low-cost, long-life distributable propulsion for control of femtosats, picosats, nanosats, microsats, and space structures. The concept is scalable from power levels of 1 W to several kilowatts with thrust efficiency approaching 60%.

17 Claims, 4 Drawing Sheets

(showing the configuraton of 13 of FIG. 4)

(showing the configuraton of 13 of FIG. 4)

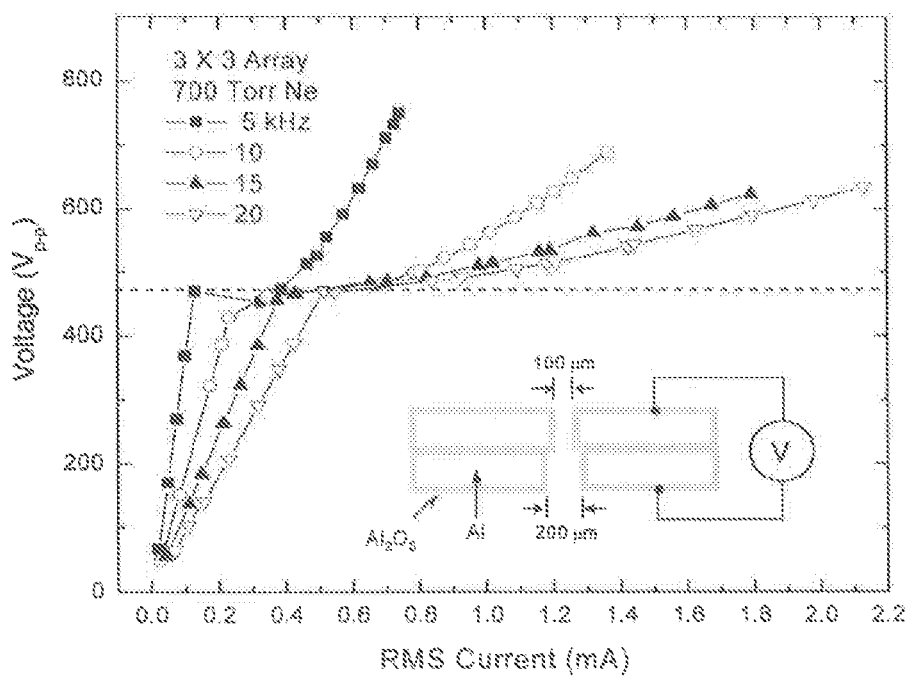
Fig. 2. V-I Characteristic for microcavity discharge
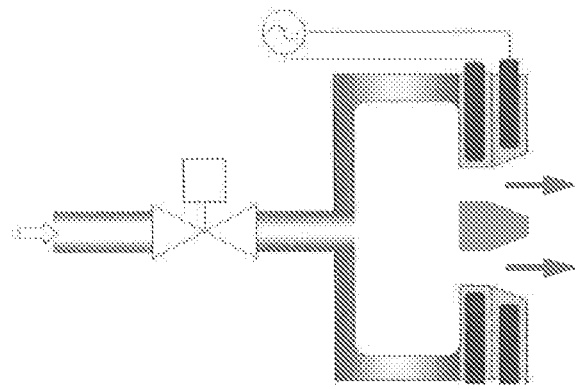
Fig. 3
PRIOR ART In Figure 4, DI refers to discharge initiation electrode; SD refers to sustaining discharge electrode; CC refers to capacitively coupled/insulated from plasma; and DC refers to directly coupled/exposed to plasma.

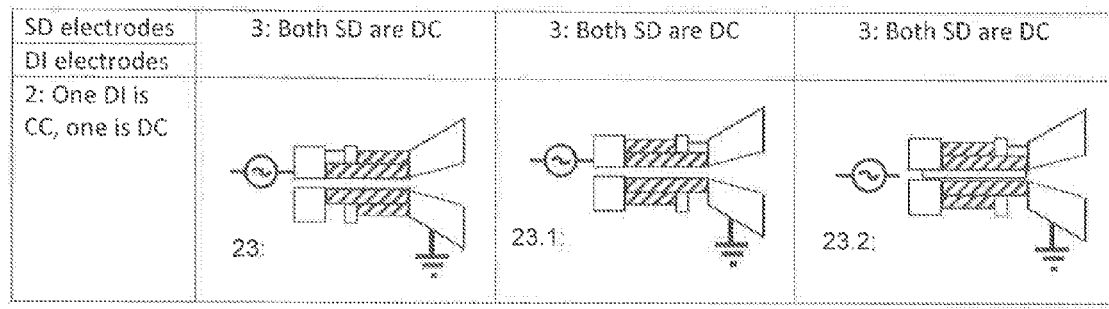
Fig. 5.
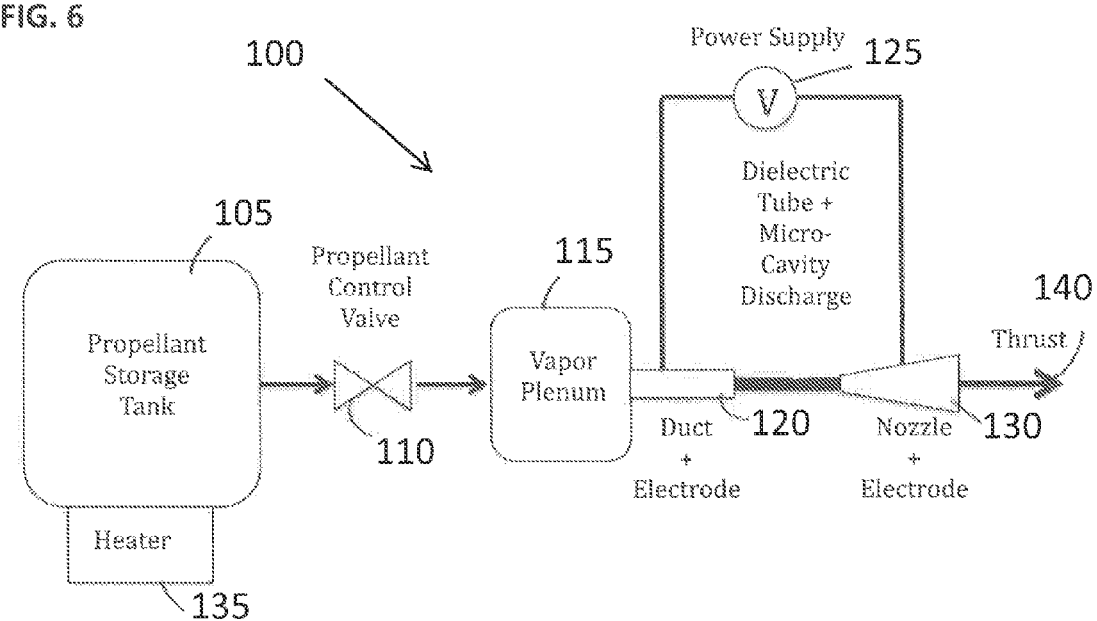

SPACE THRUSTER USING ROBUST MICROCAVITY DISCHARGE AND ADVANCED PROPELLANTS

CROSS REFERENCE TO RELATED APPLICATIONS

The present invention claims priority to U.S. Application 61/561,317 filed Nov. 18, 2011.

BACKGROUND OF THE INVENTION

The Air Force, DoD, NASA, and commercial spacecraft manufacturers all have a growing interest in replacing small chemical thrusters, reaction wheels, and magnetic torque rods with more advanced, lighter weight, lower power, more controllable micro-propulsion alternatives. In addition to this need, propulsion systems having mass and power scalability over a wide range that achieve large changes in satellite velocity are highly desirable, thus opening up a wide range of orbital maneuvering applications for micro-, nano-, pico-, and femto-satellites, and the control of flexible structures. Furthermore, ultra-compact packaging and extremely low mass of the propulsion system, coupled with dense, easily-handled solid or liquid propellants, are highly desirable to achieve high thrust impulse and optimal thruster placement on the spacecraft, to maximize control without adversely impacting fields-of-view, and to minimize the exposure of sensors to exhaust plume impingement.

SUMMARY OF THE INVENTION

It is disclosed herein a breakthrough concept for in-space propulsion for future satellite systems. The invention combines the fields of micro-discharge physics and non-equilibrium plasmadynamics to reduce dramatically the size of electric thrusters by one to two orders of magnitude, which when coupled with low-erosion or zero-erosion electrodes operating with high system efficiency, will enable scalable, low-cost, long-life, moderate-thrust propulsion for control of micro-satellites, nano-satellites, and space structures. The concept is scalable from power levels of 1 W to several kilowatts with thrust efficiency ($\eta_t$=the ratio of exhaust flow kinetic power to terminal input power) approaching 60%. Ultimate specific impulse would be 400 seconds with helium, with lower values for higher molecular weight propellants.

BRIEF DESCRIPTION OF THE FIGURES

FIG. 2 is voltage-current (V-I) characteristics for a 3×3 microcavity array of $Al_2O_3$/Al micro-discharge devices operating in the abnormal glow mode, qualitatively illustrated in the inset;

FIG. 3. is a prior art schematic of the Microcavity Discharge (MCD) Thruster from U.S. patent application Ser. No. 12/589,182, showing multiple nozzles and capacitively-coupled AC electrodes formed from oxidized layers of thin metal sheets, such as aluminum foil;

FIG. 5. is a matrix showing variations of Configuration 23 (from FIG. 4) of Microcavity Discharge (MCD) Thrusters using various arrangements of sustaining and discharge initiation electrodes, which can be capacitively or directly coupled to the discharge plasma (other Configurations may also have various arrangements of sustaining and discharge initiation electrodes); and FIG. 6 is a schematic illustration of a thruster in accordance with an embodiment of the present invention.

DETAILED DESCRIPTION OF THE INVENTION

One aspect of the invention is a 100 micrometer-scale plasma source called the microcavity discharge (MCD), used primarily as a light source, the properties of which are highly adaptable to propulsion. Unlike previous attempts at micro-discharge thrusters that failed because they operated in an arc mode, this development, the MCD thruster, operates in a normal glow or an abnormal glow discharge mode at high voltage and low current.

This new technology can revolutionize low-power electric propulsion for femto-, pico-, nano-, micro- and even larger satellites to perform various mission tasks including orbit transfer, de-orbiting, station-keeping, position, attitude and acceleration control, and structure control. An early version of the MCD thruster is the subject of U.S. patent application Ser. No. 12/589,182.

Figure 1:
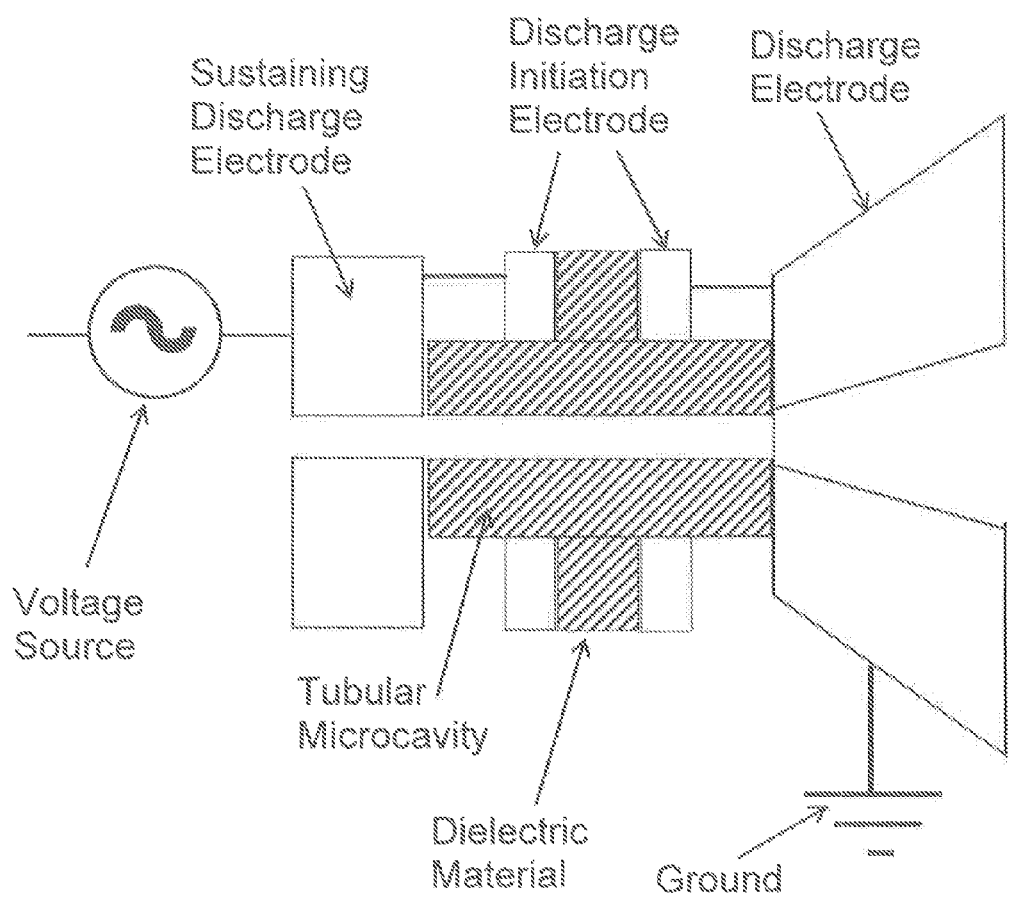
FIG. 1 is an MCD thruster schematic of a sustaining electrode pair, discharge initiation electrode pair, and microcavity with integrated micronozzle with or without an included geometric throat.

The invention presented herein includes enhancements beyond the technology of patent application Ser. No. 12/589,182, and forms the basis for a new electrothermal thruster that is particularly applicable to space satellites. The propulsion system is simple, consisting of 1) a propellant tank, 2) a controllable valve with pressure sensor to control propellant vapor feed pressure, 3) an inverter operating at a frequency in the range of 20 kHz to 27 MHz with step-up transformer to a typical value of, but not limited to, 1500 volts peak-to-peak AC, 4) two electrodes that capacitively or directly supply current pulses to a 0.1-1.0 atmosphere plasma in a 50-1000 µm diameter microcavity to heat the propellant (FIGS. 1 and 5), and 5) a low Reynolds number micronozzle to accelerate the heated gas and increase thrust.

One important aspect of one or more embodiments of the invention is operation in the abnormal glow discharge mode, permitting scalability through parallel operation of microdischarge cavities from very small to significantly large thrust levels at low rates of electrode erosion. Arc discharges have a negative resistance V-I characteristic and are thermally unstable in parallel without ballast. In the abnormal glow mode the ionization fraction is <<1% and the slope of the V-I characteristic is positive (FIG. 2), thus allowing parallel operation and power scaling at high efficiency. FIG. 2 displays abnormal glow parallel operation of a 3×3 microcavity matrix, at a power of 0.13 W/cavity. Operation in the normal or abnormal glow mode also minimizes erosion of electrodes exposed to the discharge plasma, due to the reduced coulomb transfer and absence of cathode or anode spots on the electrodes of these discharges.

Figure 4:
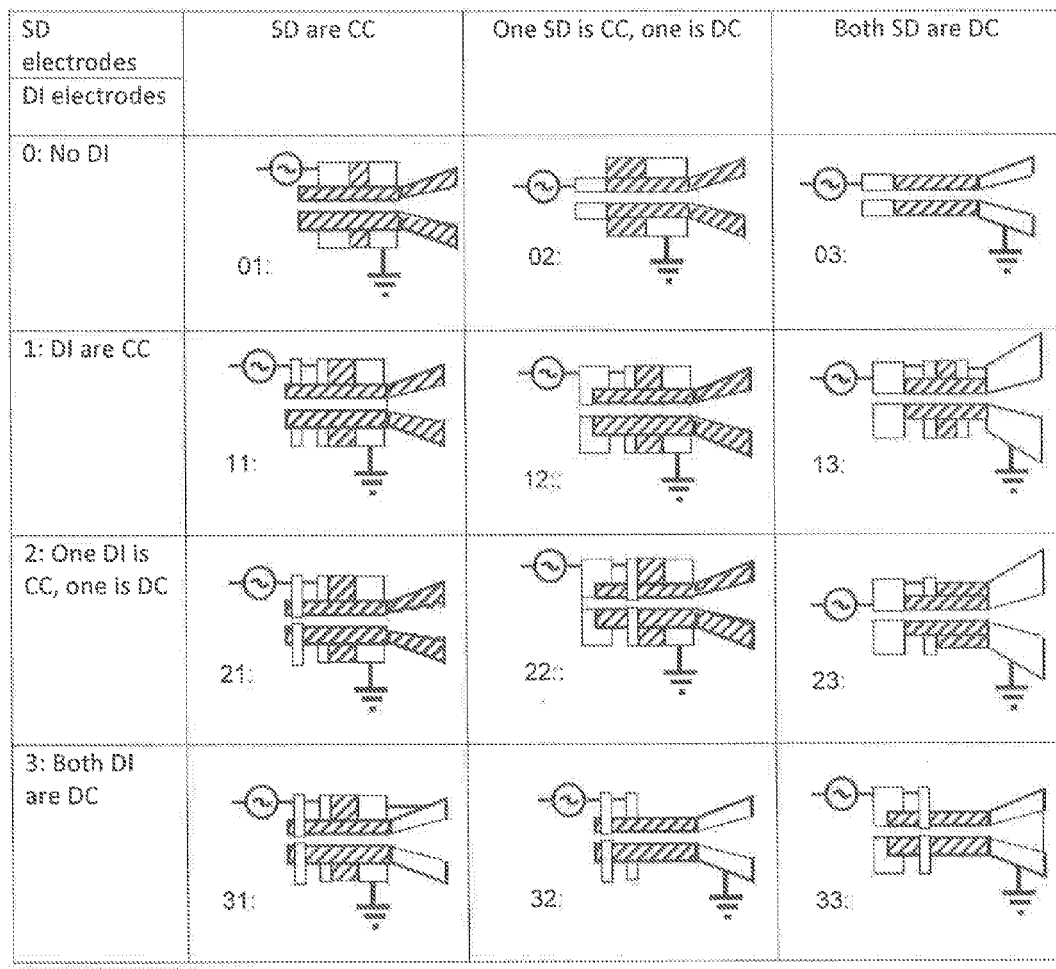
FIG. 4. is a matrix of Microcavity Discharge (MCD) Thrusters using various arrangements of sustaining and discharge initiation electrodes, which can be capacitively or directly coupled to the discharge plasma; and where shaded regions are dielectric material.

The new type of thruster of this invention, shown schematically in FIG. 4, is to modify the MCD thruster (shown schematically in FIG. 3) of U.S. patent application Ser. No. 12/589,182. The modification consists of replacing the insulator, which in FIG. 3 is typically an oxide layer grown on metal foil, with a more robust oxide tube, as shown schematically in FIGS. 4 and 5.

The choice of propellant depends both on the desired specific impulse and satellite maneuver capability, and the volume, pressure and mass limits of the propellant storage tank, with solid or liquid propellants being preferred for small tanks. It is usually desirable that solid or liquid propellants be non-toxic and self-pressurizing, and be compatible with the materials used for commercial micro-valve and pressure control hardware developed for cold gas thrusters.

The MCD thruster of this invention is a modified version of the MCD thruster of U.S. patent application Ser. No. 12/589,183 by adding a properly designed plenum, nozzle, and flow control/shutoff valve (FIGS. 3 and 4), and operating at high voltage, i.e. in the upper right of the V-I plot in FIG. 2, at a few watts per microcavity at frequencies of 20 kHz-27 MHz and even higher. The MCD thruster operates at a gas temperature of 500-2000 K, previously achieved by the MCD in the laboratory, and at higher temperature with improved materials. The electrodes and conducting nozzles can be fabricated from a variety of materials, including tungsten, tungsten carbide, sintered tungsten alloy, copper, dispersion-strengthened copper, and titanium, and electrically insulating components can be fabricated from dielectric materials such as alumina, boron nitride, or other dielectric materials.

The electrode arrangements shown in FIG. 4 display several configurations for initiating and sustaining an alternating current normal or abnormal glow discharge in a small diameter insulating tube. The matrix of twelve MCD thruster types in FIG. 4 can be capacitively or directly coupled to the discharge plasma. Shaded regions are dielectric material and it is important to note that the micronozzles can be fabricated with or without a geometric throat. As illustrated in FIG. 4, DI refers to discharge initiation electrode; SD refers to sustaining discharge electrode; CC refers to capacitively coupled/insulated from plasma; and DC refers to directly coupled/exposed to plasma.

Configuration 01, which incorporates capacitively coupled sustaining electrodes and no discharge initiation electrodes, is anticipated by U.S. patent application Ser. No. 12/589,183. The electrode placement of Configuration 23, which incorporates directly coupled sustaining electrodes with a capacitively coupled discharge initiation electrode, is anticipated by U.S. Pat. No. 6,295,804, "Pulsed Thruster System." The base electrode placement of Configuration 23 anticipated by U.S. Pat. No. 6,295,804 describes a high-current, low-voltage arc discharge device, for which the pressure of operation, the frequency of the pulses (repetition rate), geometry sizes, and propellant are all dramatically different than for the microcavity configurations discussed herein. Further, the MCD is a cold gas continuous pressure-fed thruster that uses the MCD to warm the gas and reduce the propellant flow rate, thus extending propellant life. Whereas, the Pulsed Arcjet of U.S. Pat. No. 6,295,804 is a pulsed thruster that uses a low frequency sequence of arc discharges from a capacitor to raise pressure and temperature of separately-injected slugs of gas, producing a train of thrust impulse bits.

Electrode arrangements can also have variations such as those shown in FIG. 5 for configuration 23. For example, Configuration 23.1 changes polarity such that the ground electrode has both an exposed and a capacitive electrode, and Configuration 23.2 illustrates that the central high-voltage electrode can be run inside of the dielectric tube. Propellant is then fed through or around the central high-voltage electrode.

The MCD thruster is predicted to achieve up to 60% efficiency at 180 s with neon propellant, or 400 s with helium. Maximum input power will be 1-500 W per cavity.

The vapor propellant feed system is adapted from known technology, including filters to prevent particle contamination in 100 µm-scale orifices. The MCD can be operated with capacitively-coupled electrodes insulated with a dielectric such as alumina ($Al2O3$), or direct-coupled electrodes, with a dielectric insulator, and has been tested to a life far in excess of the thrust time, even with oxygen-containing propellant. Voltage levels are modest (typically, but not limited to, 1500 V peak-to-peak or less), and the system does not require an ion beam neutralizer for operation. The predicted maximum thrust efficiency of 60% exceeds considerably that of other types of micro-thrusters. Thruster mass and volume is much smaller than that of other types of micro-thrusters.

Technology development on the MCD (Microcavity Discharge) began in 2000 at the University of Illinois, with the objective of being used as a light source with practical applications for high resolution/thin-film plasma displays and medical treatment. This technology was recently scaled to a large array size of 40,000 microcavities indicating that MCD thruster technology can also be scaled for this propulsion application.

The predicted thrust efficiency of 60% for monatomic propellants is much higher than that of other low power electrothermal, ion or Hall microthrusters, because:
1. Ionization fraction is <<1%, and frozen flow loss from ionized exhaust is negligible.
2. No auxiliary systems are needed, e.g. neutralizer, heater, igniter.
3. Operating pressure is 0.1-1.0 atm., giving reasonable nozzle Reynolds numbers, and low viscous losses.
4. The power processing unit (PPU) is typically comprised of a DC-AC inverter or pulsed DC power supply with low specific mass operating at a frequency of 20 kHz to 27 MHz. PPU efficiency typically exceeds 80% with a specific mass of 3 g/W.
5. The system incorporates capacitively-coupled and/or direct-coupled electrodes, minimizing sheath loss and electrode ablation.
6. Power is coupled via the normal or abnormal glow discharge, so electrodes remain relatively cool, and heat loss is minimized. Power density is extremely high, up to $10^{10}$-$10^{12}$ W/m$^3$ (10-1000 W/mm$^3$). Calculations of heat loss at the operating Reynolds number, using a Nusselt number model, predict a loss of less than 5% of the input power for argon, with the loss scaling as the inverse square root of molecular weight. The primary reason the heat loss is low is that the cavity length and diameter are extremely small, resulting in a small wall area.

Additional features of the proposed MCD thruster system are:
1. The MCD thruster is throttleable by varying source pressure.
2. The MCD thruster has very low thrust noise, making it a candidate for certain AF and NASA missions requiring extremely precise, low-noise acceleration control.
3. High stagnation temperatures are possible, much higher than attainable with the resistojet (1500 K has been obtained with Al/$Al_2O_3$ electrodes), without the need for bulky, inefficient thruster insulation.
4. A very low system mass and volume is anticipated, allowing use on very small satellites with mass as little as a hundred grams.
5. Electrode erosion is very low, because the ion sputtering erosion mechanism is significantly reduced by operating in low current normal and abnormal glow discharge modes.

An important feature of the MCD thruster is the capability of operating at a Reynolds number (Re) sufficiently high so that the nozzle flow is not dominated by viscous wall drag. Typically this means Re>1000. Higher Re operation is possible because, although the diameter and length of the MCD thruster are small, the pressure is relatively high. This is necessary because the MCD, in order to maintain a breakdown voltage of around, but not limited to, 1500 volts or less, typically operates at a pd (pressure times electrode gap) value of 2-10 Torr-cm. At the upper end of the range, this implies that a 500 micro-meter (0.05 cm) diameter cavity needs a pressure of 200 Torr (0.26 atm). This value is sufficient to keep the Re high enough to operate the nozzle efficiently.

Another asset of the microcavity discharges mentioned earlier is that these plasmas operate in the normal or abnormal glow region in which the voltage-current (V-I) characteristic has a near-zero or positive slope. In contrast to conventional (macroscopic) arc plasmas with a negative V-I slope, microcavity discharges do not require external ballast, a source of power loss. From the measured plasma resistivity, typically tens to hundreds of kilo-ohms, the degree of ionization α can be inferred. We infer a level of α less than 0.001%, and hence a very small nozzle loss due to ionization. Dissociation can be a significant power sink for polyatomic propellants, however, due to electron impact dissociation.

MCD Thruster Efficiency

The high efficiency of the MCD thruster can be supported by heat transfer calculations. The first model calculates a heat transfer coefficient h [W/m$^2$-K] from the well-known Nusselt number relation Nu=hD/k, where Nu=0.023(Pr)$^{0.4}$(Re)$^{0.8}$, k is thermal conductivity and D is taken as $(A_{wall})^{1/2}$. For a typical MCD thruster the wall area is $A_{wall}$=0.063 mm$^2$, giving D=0.25 mm. The Nusselt number calculation gives a heat transfer coefficient h for the MCD thruster of 520 W/m$^2$-K and the resulting $hA_{wall}$ is 3.3×10$^{-5}$ W/deg K.

Since the MCD thruster operates at a power level of (2-3 W) and a temperature of (1000-2000 K), the maximum value of $hA_{wall}$ ΔT is ~66 milliWatts, and the conclusion is that the MCD thruster has a small heat loss.

A second model of the wall heat loss is based on the Reynolds analogy, which relates heat transfer to skin friction through the statement that similar boundary layer solutions exist for the momentum and energy equations for laminar flow, as discussed in the literature. The Reynolds Analogy relationship of heat transfer rate to shear stress, for fluid temperature T and velocity U, can be written:

$$\dot{q}_w = \frac{\tau_w C_p (T - T_w)}{U}$$

where $\dot{q}_w$ is the local wall heating, and $\tau_w$ is the local wall shear stress, related to the friction coefficient f and the fluid dynamic pressure q=ρU$^2$/2 by:

$$\tau_w = f \cdot \tfrac{1}{2} \rho U^2$$

Using the low Re (laminar flow) friction coefficient f=16/Re, we derive a simple heating relation:

$$\dot{Q}_w = 4\pi\mu C_p (T_{max} - T_w) L$$

where μ is the viscosity in Pascal-seconds, L is the length of the flow duct in meters, $T_w$ is constant, and T(x) increases linearly from $T_w$ at x=0 to $T_{max}$ at x=L.

Note that the heat loss is independent of the diameter, and the fractional heat loss only depends on the flow duct length. The goal is to find the fractional heat loss, given by:

$$\theta = \frac{\dot{Q}_w}{P_{in}}$$

For input power:

$$P_{in} = \dot{Q}_w + \dot{m} C_p (T_{max} - T_w)$$

the fractional heat loss is given by:

$$\theta = \frac{\dot{Q}_w}{P_{in}}$$

$$\frac{\theta}{1-\theta} = \frac{4\pi\mu L}{\dot{m}}$$

where ρ is average value for viscosity. The model predicts that low L and high mass flow rate are desirable, with the latter implying high pressure. For μ=2×10$^{-5}$ Pa-s, L=2 mm, and mass flow rate=10 mg/s, θ=0.05.

Finally, our past experience with other microthrusters has shown that the dominant flow loss is nozzle frozen flow loss due to dissociation and ionization. For the MCD thruster ionization loss is not significant, since the degree of ionization is very small (~0.001%). Dissociation can be a significant power sink for polyatomic propellants, however, due to electron impact dissociation.

A major determiner of thrust efficiency is viscous losses at the nozzle wall due to the required Reynolds number regime. If the nozzle expansion drops the flow temperature to an exit temperature $T_e$, the nozzle thermal efficiency $\eta_N$ can be expressed as:

$$\eta_N = 1 - T_e/T_o = \frac{(\gamma-1)M_e^2}{(\gamma-1)M_e^2 + 2}$$

For the expected $M_e$=4 based on similar nozzles, $\eta_N$=0.71 (γ=1.3) and 0.84 (γ=1.67). These values are supported by experimental data. When added to heat loss, plume divergence and distribution loss, we anticipate an MCD thrust efficiency approaching 60% for monatomic propellants, and lower for dissociating polyatomic propellants.

Full advantage of the potential of the MCD thruster is achieved by using advanced, innovative thruster propellants. In order to reduce cost, simplify the propulsion system, and maximize orbital maneuvering capability, the best propellants are high density, self-pressurizing liquids. It is recognized that these advanced propellants are not necessarily chosen to maximize thruster exhaust velocity and specific impulse, but rather to maximize the momentum impulse for a space satellite of limited volume. Because these advanced propellants are often self-pressurized (that is, the boiling point is below zero degrees Celsius), the propellant feed system requires only the appropriate opening of a valve to allow propellant to flow from the propellant storage tank to the MCD thruster.

A study of a large number of liquid propellants has determined a small number of propellants that 1) maximize the property pa, which is the product of the liquid density ρ [kg/m$^3$] and the vapor speed of sound a [m/s], 2) are self-pressurizing, and 3) are safe to handle. A list of these propellants and their boiling points (B.P.) that can be used in the MCD thruster includes:

Sulfur dioxide, $SO_2$ (B.P. −10 C)
1,1,1,2-Tetrafluoroethane (R134a), $CH_2FCF_3$ (B.P. −26 C)
Isobutane (R-600a), $C_4H_{10}$ (B.P. −12 C)
Ammonia, $NH_3$ (B.P. −33 C)
Nitrogen Tetroxide, $N_2O_4$ (B.P. 21 C)
Liquid water (heated), $H_2O$ (B.P. 100 C)

Note that for the case of water, the MCD thruster may operate at a pressure less than 1 atmosphere.

For some MCD propulsion applications, it is appropriate to use propellants that are self-pressurizing, but with low vapor pressures. Such a situation can occur, for example, when a given satellite has secondary heaters available to enhance pressurization and prevent freezing. For this situation additional propellants with high ρa are:

Liquid Water (unheated), $H_2O$ (B.P. 100 C)
Hydrazine, $N_2H_4$ (B.P. 114 C)

The microcavity discharge (MCD) thruster system is expected to have a high specific thrust, high thrust density, and high specific power, with high propellant utilization and a simple power processor. Efficiency is predicted as approaching 60%, and power scalability is straightforward over a wide range. Lifetime resulting from low internal thruster erosion rates is expected to be long, due to operation in the normal or abnormal glow discharge mode.

As such the present invention can provide for an arrangement of electrodes that provides for both repeated initiation and maintenance of the discharge, where if initiation electrodes are used, they each can be either capacitively or directly coupled to the propellant plasma, and where discharge maintaining electrodes each can be either capacitively or directly coupled to the propellant plasma. A total of 12 possible configurations: 4 possible initiation configurations× 3 possible sustaining configurations can be provided, illustrated in FIG. 4.

The present invention provides for various aspects outlined herein. One of which is defined to include a satellite thrust propulsion system comprising a sulfur dioxide ($SO_2$) propellant. The advantage of sulfur dioxide propellant is that it has a uniquely favorable combination of liquid density, vapor pressure, and vapor sonic velocity. This satellite thrust propulsion system may further include an electric propellant heating system to heat the sulfur dioxide.

In other embodiments of the present invention there is provided an electrothermal satellite thrust propulsion system, illustrated at FIG. 6, that operates in the vacuum of space. The system 100 would include a solid or liquid storage tank 105 holding a solid or a pressurized liquid propellant. A controlled propellant valve 110 is coupled to the tank 105 for controlling the release of propellant vapor into a plenum 115. A duct 120 connects the plenum 115 to at least one tubular microcavity 120, allowing vapor to flow from the plenum into the microcavity at subsonic velocity. The at least one tubular microcavity 120 has a diameter of about 50-2000 microns. An alternating current power supply 125 in the frequency range of 20 kHz to 27 MHz is in communication with discharge initiation and sustaining electrodes and is coupled to at least one microcavity, for which power is supplied to heat the propellant vapor by means of a normal or abnormal glow discharge into a weakly-ionized non-equilibrium plasma. This creates a maximum heavy particle temperature of about 500-2000 K, wherein increasing the temperature of the weakly ionized plasma through the microcavity increases the sonic velocity of the subsonic plasma as it discharges out of the microcavity. A supersonic expansion nozzle 130 operating in the vacuum of space, is fed by the propellant plasma heated by an electric propellant heating system 135 creating a supersonic exhaust jet producing thrust 140.

The thruster systems may include a solid or liquid or gas propellant. In addition the heater system may use solar thermal panels to absorb and store solar thermal energy which is used by the heater to create a propellant vapor using the stored solar thermal energy. Alternatively, the propellant may be heated to a vapor state by an electrically-powered heater. Yet in other aspects the propellant may be heated to a vapor state by waste heat collected from the electric propellant heating system, the thruster valves, the thruster control board, and the MCD thruster body.

Other embodiments may include having a thruster where the alternating discharge plasma current operates with a continuous sinusoidal or an oscillating waveform. The alternating discharge plasma current may also operate discontinuously with a separate voltage breakdown and short-duration current pulse at each half cycle.

The thruster in various embodiments may include a sequence of separate unipolar pulses to create the normal or abnormal glow discharge, for which the current in the pulses does not reverse direction, and for which the pulse frequency is in the range of 20 kHz to 27 MHz.

In yet other embodiments, the thruster may include an array of microcavities operated electrically in parallel, for which power is supplied to heat the propellant vapor by means of normal or abnormal glow discharges operating electrically and fluid dynamically in parallel.

The present invention may also include a converging-diverging electrically conducting micronozzle downstream of each microcavity that expands the heated propellant, accelerating it to create a supersonic exhaust jet producing thrust. In some aspects the micronozzle can be electrically insulating.

The thruster systems discussed in various embodiment may include electrodes fabricated from tungsten carbide having high temperature operation, high electrical and thermal conductivity, and high material compatibility with propellants.

In other aspects of the invention there may be provided a micocravity discharge operated as a thruster at radio frequencies (RF) of 20 kHz to 27 MHz where the RF is created from a satellite DC bus voltage using a DC-AC inverter and step-up transformer or pulsed DC power supply. In further aspects there may be provided a micocravity discharge operated in the normal or abnormal glow discharge mode, for which the voltage increases with current as a positive slope resistance characteristic permitting a large number of discharge microcavities to be operated in parallel.

In various aspects of the embodiments there may be provided propellants for microcavity discharge thrusters that are self-pressurizing two-phase liquids at temperatures of 0-80 degrees C, including, but not limited to: Sulfur dioxide, 1,1,1,2-Tetrafluoroethane (R134a), $CH_2FCF_3$, Isobutane (R-600a), C4H10, Nitrogen Tetroxide (N2O4), Ammonia, and Water. The propellants for microcavity discharge thrusters may also be self-pressurizing at temperatures of 0-80 C, but may have low vapor pressures and secondary heaters enhance pressurization in the storage tank to prevent freezing, and wherein the propellants include, but are not limited to water and Hydrazine.

The various embodiments may include configuring the thruster system to operate with the power off, creating cold-gas thrust. Yet still further, the thruster system may include a microcavity having a dielectric tube or other electrically non-conducting tube. The dielectric tube can be made of a ceramic material such as, but not limited to, alumina, sapphire, or boron nitride. The tube may be, but not limited to, a cylindrical geometry.

In addition, a thruster may be provided wherein the exhaust end of the microcavity tube feeds propellant to the throat of or beginning of a diverging supersonic nozzle or converging-diverging nozzle. The supersonic nozzle may also be made of an electrically non-conducting material that insulates one electrode of the discharge circuit. However, the supersonic nozzle may also be made of an electrically non-conducting material that is located adjacent to and downstream of an un-insulated main electrode of the discharge circuit. The supersonic nozzle may be made of a ceramic or other nonelectrically conducting material, or made of an electrically conducting material that forms one main electrode of the discharge circuit.

In addition, the entrance end of the at least one microcavity tube may be configured to accept unheated propellant. The entrance end of the tube may also be located adjacent to one main electrode of the discharge circuit. Alternatively, the electrode at the entrance end of the tube may be located outside the tube and is not exposed to the propellant, done at a fixed separation distance from the electrode at the exhaust end of the tube. In yet other embodiments, the electrode may be at the entrance end of the tube located inside the tube and is exposed to the propellant, at a fixed distance from the electrode at the exhaust end of the tube. In these aspects, a pair of discharge initiation electrodes may be located in-between the two separated main electrodes or one of the discharge initiation electrodes may be one of the separated main electrodes. In either case, one or both of the discharge initiation electrodes is either exposed or not exposed to the propellant.

The ground electrodes in FIGS. 4 and 5 may be grounded to the spacecraft or the power processing unit. FIGS. 4 and 5 do not restrict the placement of the ground electrode, and the nozzle may be the high voltage electrode.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred.

We claim:

1. An electrothermal satellite thrust propulsion system for operating in the vacuum of space comprising:
    a storage reservoir holding a pressurized gaseous or liquid propellant;
    a controlled propellant valve coupled to the storage reservoir for controlling the release of propellant vapor into a plenum;
    a duct connecting the plenum and at least one tubular microcavity, allowing propellant vapor to flow from the plenum into the at least one tubular microcavity at a velocity which is subsonic, and wherein the at least one tubular microcavity has a diameter of 50-2000 microns;
    an alternating current in the frequency range of 20 kHz to 27 MHz being in communication with a pair of discharge initiation electrodes and pair of sustaining discharge electrodes and being further coupled to the at least one tubular microcavity, for which power is supplied to heat the propellant vapor by means of a normal or abnormal glow discharge into a weakly-ionized non-equilibrium flowing plasma to create a maximum heavy particle temperature of 500-2000 K, and wherein increasing a temperature of the weakly-ionized non-equilibrium flowing plasma through the at least one tubular microcavity increases a velocity of the weakly-ionized non-equilibrium flowing plasma as it discharges out of the at least one microcavity, and wherein the pair of discharge initiation electrodes are capacitively coupled to the weakly-ionized non-equilibrium flowing plasma and wherein the pair of sustaining discharge electrodes are either (i) both capacitively coupled to the weakly-ionized non-equilibrium flowing plasma, (ii) both directly coupled to the weakly-ionized non-equilibrium flowing plasma, or (iii) one of the sustaining discharge electrodes is capacitively coupled to the weakly-ionized non-equilibrium flowing plasma and the other sustaining discharge electrode is directly coupled to the weakly-ionized non-equilibrium flowing plasma; and
    a supersonic expansion nozzle, for operating in the vacuum of space, that is fed the weakly-ionized non-equilibrium flowing plasma creating a supersonic jet producing thrust.

2. The electrothermal satellite thrust propulsion system of claim 1, where the alternating current operates with a continuous pulse train with a repeating unipolar pulse or oscillating waveform.

3. The electrothermal satellite thrust propulsion system of claim 1, where the alternating current operates discontinuously with a separate voltage breakdown and short-duration current pulse at each half cycle or unidirectional pulse.

4. The electrothermal satellite thrust propulsion system of claim 1, further comprising an array of microcavities operated electrically in parallel and connected to the plenum, for which power is supplied to heat the propellant vapor by means of normal or abnormal glow discharges operating electrically and fluid dynamically in parallel.

5. The electrothermal satellite thrust propulsion system of claim 1, wherein the supersonic expansion nozzle is a converging-diverging micronozzle downstream of the at least one tubular microcavity that expands the propellant vapor, accelerating it to create a supersonic exhaust jet producing thrust.

6. The electrothermal satellite thrust propulsion system of claim 5, wherein the converging-diverging micronozzle is electrically insulating or electrically conducting.

7. The electrothermal satellite thrust propulsion system of claim 1 wherein an entrance end of the at least one tubular microcavity tube accepts unheated propellant.

8. The electrothermal satellite thrust propulsion system of claim 1, wherein an entrance end of the at least one tubular microcavity is located adjacent to one of the discharge initiation electrodes.

9. The electrothermal satellite thrust propulsion system of claim 1, wherein the pair of discharge initiation electrodes are located in-between the pair of sustaining discharge electrodes.

10. The electrothermal satellite thrust propulsion system of claim 9, wherein one of the discharge initiation electrodes is one of the sustaining discharge electrodes.

11. An electrothermal satellite thrust propulsion system for operating in the vacuum of space comprising:
    a storage reservoir holding a pressurized gaseous or liquid propellant;
    a controlled propellant valve coupled to the storage reservoir for controlling the release of propellant vapor into a plenum;
    a duct connecting the plenum and at least one tubular microcavity, allowing propellant vapor to flow from the plenum into the at least one tubular microcavity at a velocity which is subsonic, and wherein the at least one tubular microcavity has a diameter of 50-2000 microns;
    an alternating current in the frequency range of 20 kHz to 27 MHz being in communication with a pair of discharge initiation electrodes and a pair of sustaining discharge electrodes and being further coupled to the at least one tubular microcavity, for which power is supplied to heat the propellant vapor by means of a normal or abnormal glow discharge into a weakly-ionized non-equilibrium flowing plasma to create a maximum heavy particle temperature of 500-2000 K, and wherein increasing a temperature of the weakly-ionized non-equilibrium flowing plasma through the at least one tubular microcavity increases a velocity of the weakly-ionized non-equilibrium flowing plasma as the weakly-ionized non-equilibrium flowing plasma discharges out of the at least one tubular microcavity, and wherein the pair of discharge initiation electrodes are directly coupled to the weakly-ionized non-equilibrium flowing plasma and the pair of sustaining discharge electrodes are either (i) both capacitively coupled to the weakly-ionized non-equilibrium flowing plasma, (ii) both directly coupled to the weakly-ionized non-equilibrium flowing plasma, or (iii) one of the sustaining discharge electrodes is capacitively coupled to the weakly-ionized non-equilibrium flowing plasma and the other sustaining discharge electrode is directly coupled to the weakly-ionized non-equilibrium flowing plasma; and a supersonic expansion nozzle, for operating in the vacuum of space, that is fed the weakly-ionized non-equilibrium flowing plasma creating a supersonic exhaust jet producing thrust.

12. The electrothermal satellite thrust propulsion system of claim 11, wherein the pair of sustaining discharge electrodes are located in-between the pair of discharge initiation electrodes and wherein the pair of sustaining discharge electrodes are both capacitively coupled to the weakly-ionized non-equilibrium flowing plasma.

13. The electrothermal satellite thrust propulsion system of claim 11, wherein one of the discharge initiation electrodes of the pair of discharge initiation electrodes is one of the sustaining discharge electrodes from the pair of sustaining discharge electrodes.

14. The electrothermal satellite thrust propulsion system of claim 11, where the alternating current operates discontinuously with a separate voltage breakdown and short-duration current pulse at each half cycle or unidirectional pulse.

15. An electrothermal satellite thrust propulsion system for operating in the vacuum of space comprising:
  a storage reservoir holding a pressurized gaseous or liquid propellant;
  a controlled propellant valve coupled to the storage reservoir for controlling the release of propellant vapor into a plenum;
  a duct connecting the plenum and at least one tubular microcavity, allowing propellant vapor to flow from the plenum into the at least one tubular microcavity at a velocity which is subsonic, and wherein the at least one tubular microcavity has a diameter of 50-2000 microns;
  an alternating current in the frequency range of 20 kHz to 27 MHz being in communication with a pair of sustaining discharge electrodes and being further coupled to the at least one tubular microcavity, for which power is supplied to heat the propellant vapor by means of a normal or abnormal glow discharge into a weakly-ionized non-equilibrium flowing plasma to create a maximum heavy particle temperature of 500-2000 K, and wherein increasing the temperature of the weakly-ionized non-equilibrium flowing plasma through the at least one tubular microcavity increases a velocity of the weakly-ionized non-equilibrium flowing plasma as it discharges out of the at least one tubular microcavity, and wherein one of the sustaining discharge electrodes is capacitively coupled to the weakly-ionized non-equilibrium flowing plasma and the other sustaining discharge electrode is directly coupled to the weakly-ionized non-equilibrium flowing plasma; and a supersonic expansion nozzle, for operating in the vacuum of space, that is fed the weakly-ionized non-equilibrium flowing plasma creating a supersonic exhaust jet producing thrust.

16. The electrothermal satellite thrust propulsion system of claim 14, where the alternating current operates discontinuously with a separate voltage breakdown and short-duration current pulse at each half cycle or unidirectional pulse.

17. The electrothermal satellite thrust propulsion system of claim 14 further comprising a pair of discharge initiation electrodes in communication with the alternating current and wherein the pair of discharge initiation electrodes are either (i) both capacitively coupled to the weakly-ionized non-equilibrium flowing plasma, (ii) both directly coupled to the weakly-ionized non-equilibrium flowing plasma or (iii) one of the discharge initiation electrodes is capacitively coupled to the weakly-ionized non-equilibrium flowing plasma while the other discharge initiation electrodes is directly coupled to the weakly-ionized non-equilibrium flowing plasma.

* * * * *